(No Model.)
J. A. I. CLAUDON.
STEAM COCK AND CHECK VALVE.
No. 279,338. Patented June 12, 1883.
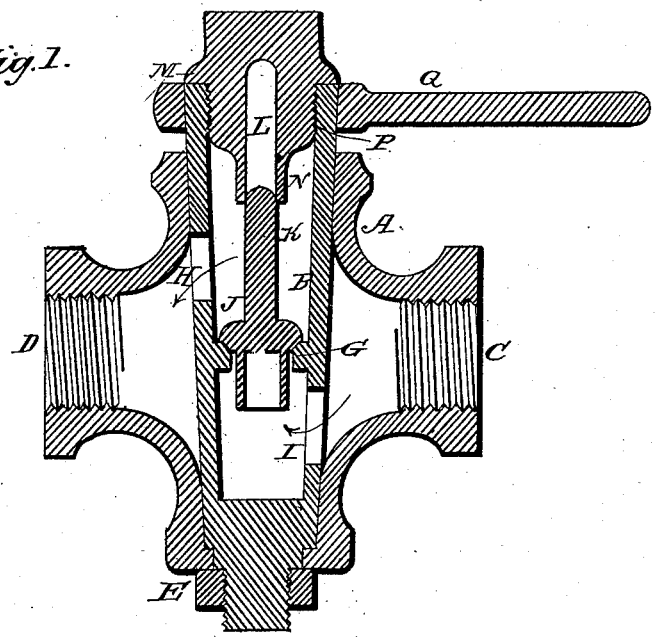
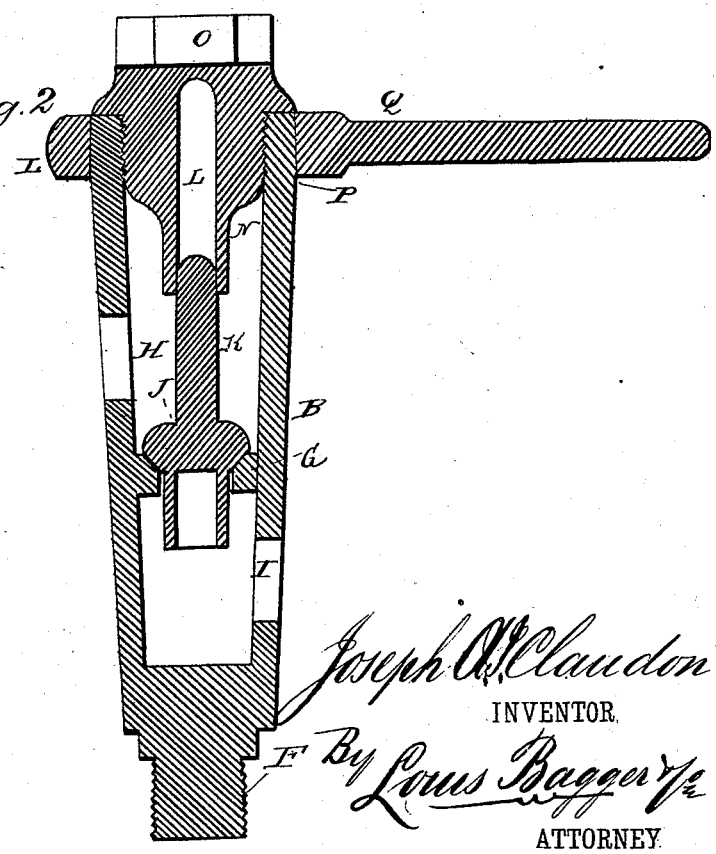
WITNESSES:
Fred. G. Dieterich
J. G. Finkel
Joseph A. I. Claudon
INVENTOR.
By Louis Bagger & Co.
ATTORNEY.

UNITED STATES PATENT OFFICE.

JOSEPH A. I. CLAUDON, OF PAOLA, KANSAS.

STEAM-COCK AND CHECK-VALVE.

SPECIFICATION forming part of Letters Patent No. 279,338, dated June 12, 1883.

Application filed December 23, 1882. (No model.)

*To all whom it may concern:*

Be it known that I, JOSEPH A. I. CLAUDON, of Paola, in the county of Miami and State of Kansas, have invented certain new and useful Improvements in Combined Steam-Cock and Check-Valve; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical sectional view of my combined steam-cock and check-valve within its casing, and Fig. 2 is a similar view, on an enlarged scale, of the steam-cock and valve alone.

Similar letters of reference indicate corresponding parts in both the figures.

My invention has relation to combined steam-cocks and check-valves; and it consists in the improved construction and combination of parts of the same, as hereinafter more fully described and claimed.

In the accompanying drawings, the letter A indicates the casing for the cock B. This casing is of the usual construction, having a screw-threaded opening, C, leading to the boiler, and a similar opening, D, diametrically opposite, which may be connected with the feed-pump or disconnected, as desired. The cock B is tapering, and fits snugly in the tapering seat in the casing, and is held in place by a nut, E, screwed upon its lower reduced end, F. The body of the cock is hollow, and has an annular valve-seat, G, inside, which divides it into two compartments. These compartments open out through the sides of the cock through two openings, H and I, diametrically opposite to each other, H opening into the upper and I into the lower compartment. In the valve-seat G fits a circular valve, J, having an upwardly-pointing stem, K, which slides up in the central recess, L, of a screw-threaded cap, M, the lower screw-threaded end, N, of which is screwed into the upper part of the hollow cock, while its upper end, O, forms a nut to permit of its being screwed in and removed at will. The upper part, P, of the cock above the casing is polygonal and provided with a wrench, Q, by which the cock may be turned. When the opening D is connected with the feed-pump and the cock turned so that the lower opening is at that side, the water, which is pumped in, will raise the valve and enter the boiler, while it will prevent the steam or water from the boiler passing out. When the connection with the feed-pump is now removed and the cock turned the steam and water will force the valve open and the boiler will blow off.

To lessen the force with which the valve is lifted, a spring may be placed around the valve-stem or in the recess in the cap.

When the valve is turned so that the openings stand at right angles to the openings in the casings the cock acts as a stop-cock, and the cap may be removed and the valve ground in its seat or other repairs performed without removing the cock.

Having thus described my invention, I claim and desire to secure by Letters Patent of the United States—

1. The combination of the hollow cock B, having openings H and I, and check-valve J, having stem K, with cap M, having polygonous upper part, O, and lower screw-threaded part, N, recessed at L, and adapted to be screwed into the upper part of the hollow cock, substantially as shown and set forth.

2. The combination of the casing A, having openings C and D, hollow cock B, having nut E upon its lower screw-threaded end, openings H and I, valve-seat G, and upper polygonous part, P, screw-threaded cap M, having recess L, valve J, having stem K, and handle Q, substantially as and for the purpose shown and described.

In testimony that I claim the foregoing as my own I have hereunto affixed my signature in presence of two witnesses.

JOSEPH A. I. CLAUDON.

Witnesses:
B. MILLER,
J. B. HOBUN.